July 18, 1967

L. J. PIANOWSKI

3,331,518

CONVEYING APPARATUS

Filed Oct. 23, 1965

INVENTOR.
Leon J. Pianowski
BY
Harness Dickey & Pierce
ATTORNEYS

July 18, 1967  L. J. PIANOWSKI  3,331,518
CONVEYING APPARATUS
Filed Oct. 23, 1965  7 Sheets-Sheet 4

INVENTOR.
Leon J. Pianowski
BY
Harness, Dickey & Pierce
ATTORNEYS.

United States Patent Office 3,331,518
Patented July 18, 1967

3,331,518
CONVEYING APPARATUS
Leon J. Pianowski, Detroit, Mich., assignor to The Udylite Corporation, Warren, Mich., a corporation of Delaware
Filed Oct. 23, 1965, Ser. No. 503,854
11 Claims. (Cl. 214—89)

The present invention broadly relates to conveying apparatus, and more particularly to an improved conveying machine for automatically conveying workpieces through a preselected sequentially phase treating cycle. More particularly, the present invention is directed to an automatic conveying machine of the so-called arm-type incorporating a series of laterally extending work supporting arms from which work racks loaded with workpieces are suspended and which racks are conveyed from one treating station to the next succeeding treating station whereby the workpieces are subjected to a selected treatment. The work supporting arms including the work racks supported therefrom are intermittently elevated to enable their transfer above intervening obstructions such as the partitions between adjoining treating receptacles.

Automatic conveying apparatuses of the type to which the present invention is applicable are in widespread commercial use for conveying workpieces through a sequential chemical, electrochemical, electroplating or the like, process, in which the workpieces are subjected to a prescribed treatment at each of a plurality of treating stations. Conveying machines of the so-called arm-type are characterized as incorporating a series of work carriages, each of which is provided with a laterally extending work supporting arm from which one or more work racks are suspended. The carriages are intermittently advanced along the treating stations and the arms thereon are intermittently raised and lowered in order to enable the work racks to be transferred above obstructions such as tank partitions separating adjoining treating stations. Of the several arm-type conveying machines heretofore known, none have provided the requisite simplicity and versatility necessary to adapt them to variations in treating cycles without necessitating the incorporation of relatively complex control systems which require a relatively high degree of maintenance and servicing detracting from the efficiency and economy in the use of such machines. For example, arm-type machines of the type heretofore known are constructed such that the individual work carriers are interconnected necessitating that the treating stations be disposed at a preselected constant interval. In electroplating operations, for example, the inflexibility of a constant rack spacing results in a significant disadvantage since it is frequently desirable to vary the distances between adjacent work racks in order to achieve optimum utilization of plant space as well as to provide for optimum treatment of the workpieces.

In addition, it is also desirable to provide means on such arm-type conveying machines whereby selected ones of the work supporting arms and the work racks supported therefrom undergo an operating cycle which deviates from the conventional processing cycle of the machine. This is usually occasioned when workpieces of different types are concurrently processed on a conveying machine and wherein certain of those workpieces do not requires a treatment at one or more treating stations or require less than the total treating time at a multiple station treating section of the machine. In machines of the type heretofore known, such selected variations have been achieved by relatively complex mechanisms and control system which detract from the economy and simplicity of the machine.

It is accordingly, a principal object of the present invention to provide an improved arm-type conveying machine which overcomes the problems and disadvantages of arm-type conveying machines of similar type heretofore known.

Another object of the present invention is to provide an improved arm-type conveying machine wherein each of the work carriages are independently supported and movable along the supporting rails enabling variations in the relative distances between adjacent arms thereby enabling the use of variably spaced treating stations achieving thereby optimum utilization of plant space as well as providing for optimum treatment of the work pieces being processed.

Still another object of the present invention is to provide an improved arm-type conveying machine in which each of the work supporting arms incorporate selector means thereon which can be readily preset at the load station or other convenient station of the machine whereby the work supporting arms are accordingly transferred through a preselected operating cycle which includes controlled deviations in the movements of the work supporting arms from the standard processing cycle of the machine.

A further object of the present invention is to provide an improved arm-type conveying machine wherein the presettable means on each of the work supporting arms is effective to control the movement of the arm through the several treating stations in a preselected manner and without requiring any ancillary controls operable in combination therewith for effecting the deviation in the sequentially phased operating cycle.

Yet still a further object of the present invention is to provide an improved arm-type conveying machine wherein the presettable means on each of the work supporting arms in combination with the mechanical structure of the conveying machine is operable to provide any one of a multiple of selected variations in the standard operating cycle achieving thereby a substantial increase in the flexible and versatility of the processing machine without any substantial increase in the complexity thereof and without the necessity of including ancillary control systems for achieving variations in the processing cycle.

Yet still another object of the present invention is to provide an improved automatic arm-type conveying machine which is of simple and compact construction, of versatile and durable operation, of relatively simple control, and of economical manufacture and use.

The foregoing and other objects and advantages of the present invention are achieved by a conveying machine including a frame having a pair of vertically spaced rails on which a plurality of work carriers are guidably and independently movably mounted and wherein each of the carriers include a laterally extending work supporting arm guidably mounted for movement to and from a raised position and a lowered position. An elevator chassis is mounted on the machine frame including supporting means thereon which are operable to selectively engage presettable laterally positionable engaging means on each of the work supporting arms to effect a raising and lowering of the arms in response to the ascending and descending movement of the elevator chassis. A plurality of elevated rails extend longitudinally of the path of travel of the work carriers which are selectively engageable by laterally positionable presettable means for retaining selected ones of the work supporting arms in a raised position over selected ones of the treating stations achieving selected varations in the basic operating cycle of the machine including a delayed set-down, early pickup, and/or skip operation.

Other objects, features and advantages of the present invention will become apparent from the subsequent description and the appended claims, taken in conjunction with the accompanying drawings, in which:

FIG. 5 is a fragmentary horizontal sectional view of the work carriage as shown in FIGURE 4 and taken substantially along the line 5—5 thereof;

FIG. 6 is a plan view of the elevator chassis diagrammatically illustrating the location of the lift pads on the elevator chassis and the disposition of the selector rails on the machine frame;

FIG. 7 is a fragmentary side elevational view of the elevator chassis and the upper portion of the machine frame as illustrated in FIGURE 6;

FIG. 15 is a side elevation view of the advancing mechanism including a carriage stop mechanism for maintaining the work carriers stationary while at a treating station.

Figure 1:
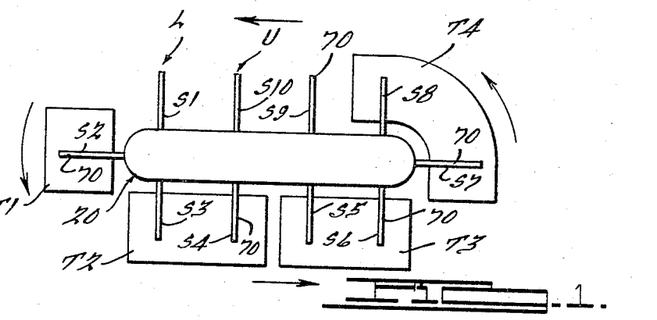
FIGURE 1 is a schematic plan view of a typical machine of the type to which the present invention is applicable and including a series of treating receptacles disposed therearound.
Figure 2:
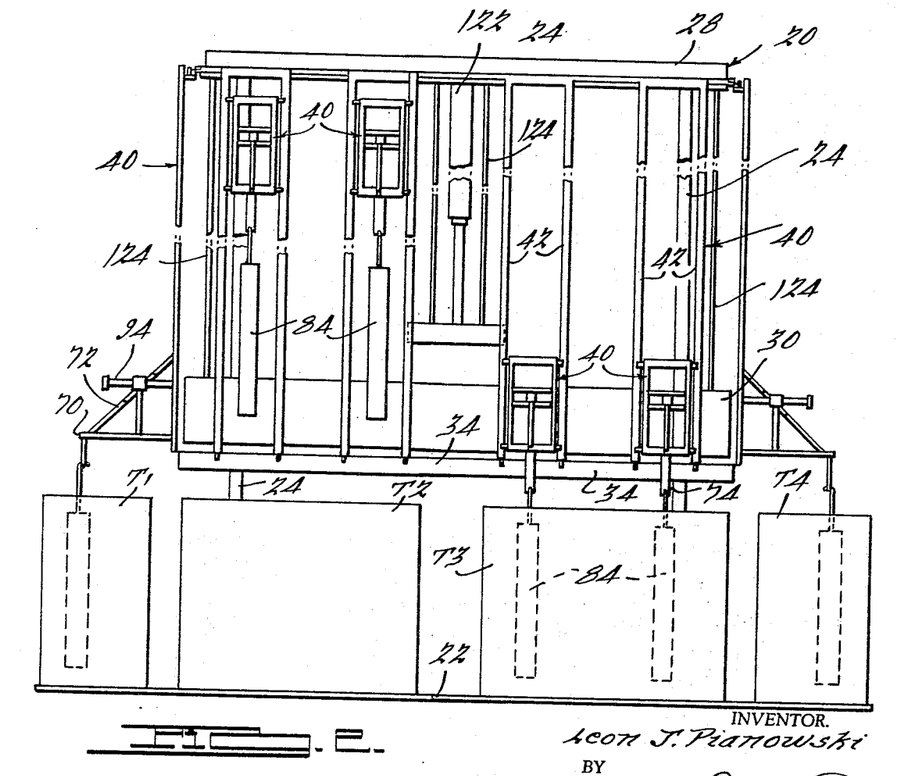
FIG. 2 is a side elevation view of the arm-type conveying machine as shown in FIGURE 1.

Referring now in detail to the drawings and as may be best seen in FIGURES 1 and 2, a conveying machine arrangement is illustrated which is of the so-called return-type in which the work supporting arms are moved in an elongated loop circle in a counterclockwise direction as viewed in FIGURE 1 from a load station indicated at L through a series of treating stations and back to an unload station indicated at U. In accordance with this arrangement, the work racks including the workpieces to be processed are loaded on the work supporting arm at the load station L and thereafter are transferred through a preselected sequentially phased operating cycle at the completion of which the work racks are removed from the supporting arms at the unload station U. While the conveying machine comprising the present invention is particularly applicable to machine arrangements of the so-called return type, in which the workpieces are conveyed in a continuous loop pattern, it will be appreciated by those skilled in the art that the principles of construction of the conveying machine are equally applicable to conveying apparatus of the so-called straight line or straight through type in which the work racks are loaded at one end of the machine and are unloaded at the completion of the treating sequence at the opposite end thereof.

The arm-type conveying machine indicated at 20 in FIGURES 1 and 2 is disposed centrally of an aligned series of treating receptacles including a single station receptacle T1, a two-station treating receptacle T2, a two-station treating receptacle T3, and a two-station treating receptacle T4. In the exemplary arrangement illustrated in FIGURE 1, the load station L corresponds to station 1 (S1) at which the work racks are loaded and from which they are transferred to station S2 which corresponds to the single station treating receptacle T1. From thence, the work racks are transferred to station S3, which corresponds to the first station of the multiple station treating receptacle T2. The second station of multiple station treating receptacle T2 corresponds to station S4. The multiple station treating receptacle T3 incorporates stations S5 and S6 from which the work arms are transferred around the arcuate end portion of the machine to station S7 corresponding to the first station of the multiple station treating tank T4. The second station of tank T4 corresponds to station S8 after which the work racks are transferred to station S9 and finally to the unload station U corresponding to station S10. It will be appreciated by those skilled in the art that the number of treating stations, as well as the number of treating receptacles and the number of treating stations within each receptacle, can be varied widely in order to accommodate the desired number of work racks as well as to achieve the appropriate treating cycle. The specific arrangement illustrated in FIGURE 1 of the drawings, is primarily intended to be illustrative of the variable processing sequences attainable in accordance with the present invention rather than being illustrative of a specific type of electroplating operation, and will suffice for obtaining a complete understanding of the structure and operating relationship of the several components comprising the arm-type conveying machine.

The structure of the conveying machine, as may be best seen in FIGURES 1 through 5, comprises a machine frame including a base platform 22 to which a pair of upright columns 24 are securely affixed at their lower ends which are rigidified by suitable longitudinal stringers 26 extending therebetween. A horizontal beam 28 is affixed to the upper ends of the upright columns 24 and incorporates the mechanism for effecting a lifting and lowering of an elevator chassis 30 movably supported and guidably mounted on the upright columns 24 for movement to and from a raised position, as shown in phantom in FIGURE 3, to a lowered position as shown in solid lines. In addition, the horizontal beam 28 serves as the upper frame work to which the selector rails and other supporting structure is mounted in a manner and for the purposes subsequently to be described.

A series of cross beams 32 are affixed to the upright columns 24 at a point spaced from the lower end thereof to the outer end portions of which a lower supporting rail 34 is fixed, which extends in a continuous manner along each of the straight side sections of the machine and is connected at the ends thereof by arcuate turnaround sections. Similarly, transverse support beams 36 are affixed to and project laterally of the horizontal beam 28 to the outer ends of which an upper supporting rail 38 is affixed which is vertically spaced from the lower supporting rail 34 and extends around the machine in a similar manner. A series of work carriers indicated at 40 are guidably and independently movably mounted between the upper and lower supporting rails 38, 34 for movement around the treating stations.

Each of the work carriers 40 are substantially identical and a detailed description of one of the work carriers will suffice for a complete understanding of each of the work carriers of the machine comprising the present invention. As may be best seen in FIGURES 3–5, the work carrier 40 comprises a frame including a pair of upright parallel spaced guide members 42 which are interconnected at the upper ends thereof by means of a transverse member 44. A pair of braces 46, as best seen in FIGURE 3, extend rearwardly of the upper portion of the guide members 42 to the upper surface of which a guide shoe 48 is affixed, which is adapted to be disposed in bearing sliding relationship against the outer surface of the upper supporting rail 38 and a roller 50 is rotatably mounted for rotation about a vertical axis with the outer surface thereof disposed in rolling bearing contact against the inner surface of the upper supporting rail 38.

Figure 3:
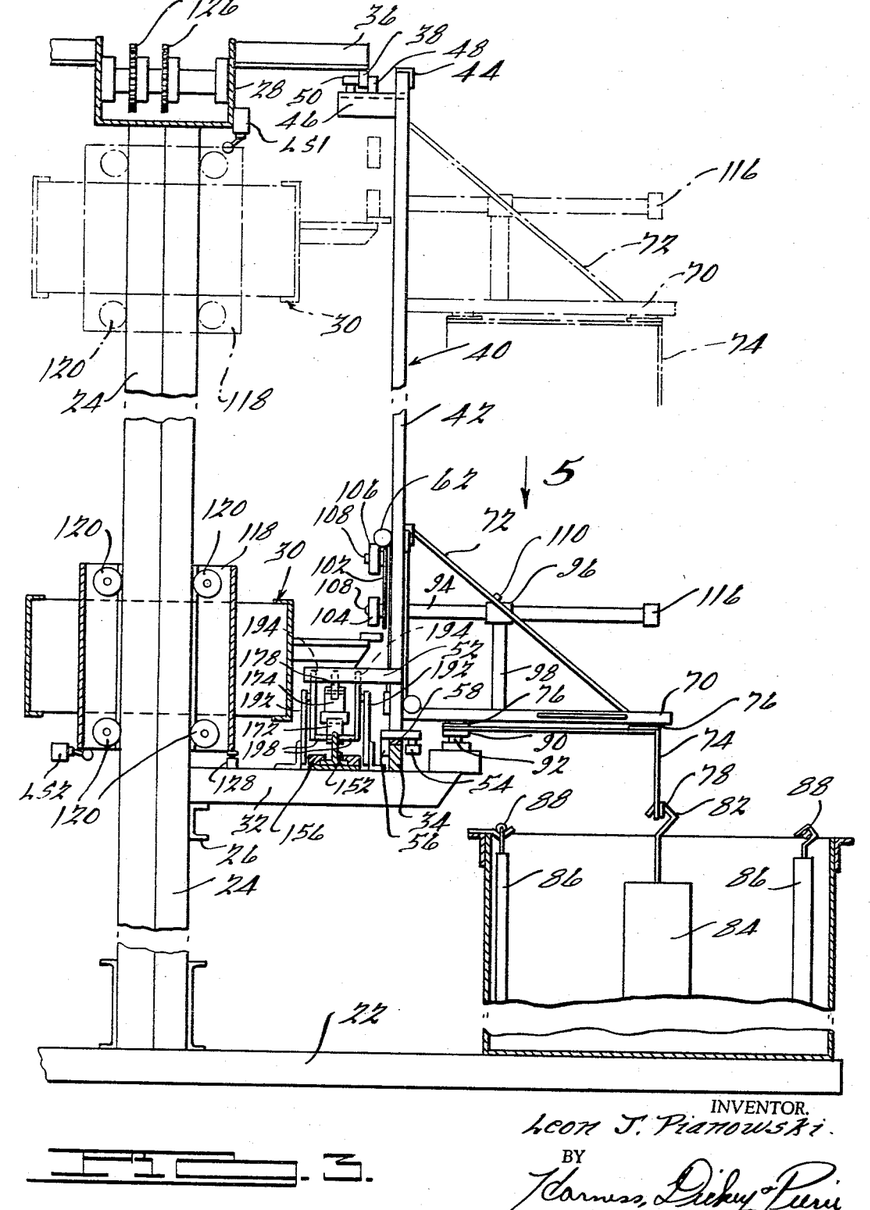
FIG. 3 is an enlarged fragmentary transverse sectional view of the machine as shown in FIGURE 2 and taken along the line 3—3 thereof.

The lower ends of the guide members 42 are interconnected by means of a U-shaped frame 52 affixed to and projecting rearwardly of the guide members 42, as best seen in FIGURES 3 and 5. A pair of rollers 54 are affixed to the lower end portions of the guide members 42 and are disposed with their peripheral surface in rolling bearing contact against the forward surface of the lower supporting rail 34. A guide shoe 56 is affixed to and depends from the lower end of each guide member and is disposed in bearing sliding contact against the rear surface of the lower supporting rail 34. The work carrier frame itself is supported on the upper edge of the lower supporting rail 34 by means of suitable antifriction members 58 which are disposed in bearing sliding contact thereagainst.

Figures 3, 4:
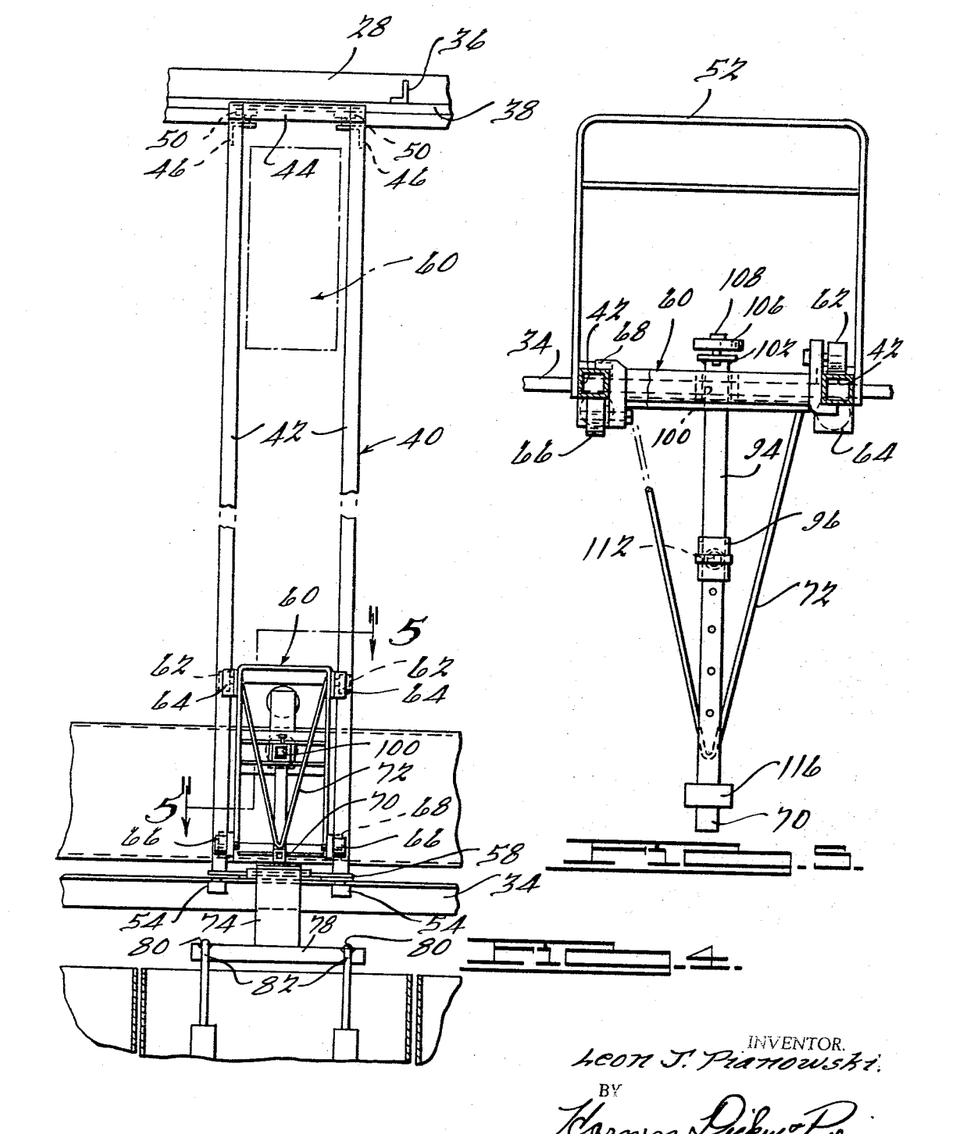
FIG. 4 is an enlarged fragmentary front elevational view of a work carriage and the work supporting arm thereon.
Figure 8:
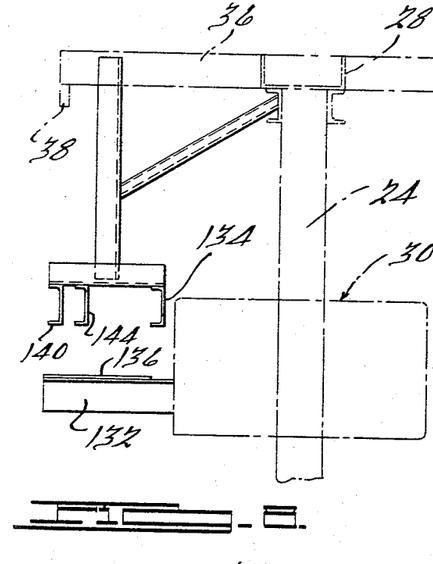
FIG. 8 is a fragmentary transverse vertical sectional view of the upper machine frame including the lift pads and selector rails thereon as shown in FIGURE 6 and taken along the line 8—8 thereof.

A carriage is guidably mounted and movably supported between the upright guide members 42 comprising the work carrier frame, as is best seen in FIGURES 3–5. The carriage comprises a rectangular frame 60 which is formed with a pair of opposed brackets at the upper ends thereof to which a pair of rollers 62 are rotatably mounted and which are disposed in rolling bearing contact against the rearward surface of each of the upright guide members 42. The brackets at the opposite side thereof are formed with a guide shoe 64 which is disposed in sliding bearing contact against the outer surface of each of the upright guide members. Similarly, the lower portions of the rectangular frame 60 of the carriage is formed with brackets including rollers 66 disposed in rolling bearing contact against the forward surface of each of the upright guide members 42 and guide shoes 68 disposed in bearing sliding contact against the rearward surfaces of the guide members. The coaction between the guide shoes 64, 68 and rollers 62 and 66 on the rectangular frame 60 of the carriage serves to maintain the carriage in appropriate guided relationship between the upright guide members when the carriage is in the raised and lowered position as well as during its movement between those positions.

A work supporting arm 70 is affixed to the lower portion of the rectangular frame 60 and projects laterally therefrom to a point outwardly and above the treating tanks T1–T4 disposed at the treating stations. The work supporting arm 70 is braced in a substantially horizontal position by means of a triangular brace indicated at 72 which extends diagonally from the upper portion of the rectangular frame 60 to a point adjacent to the outer end of the work supporting arm. An L-shaped work rack support 74, which is preferably of an electrically conductive material, is rigidly secured to the lower portion of the work supporting arm 70 and is electrically insulated therefrom by means of insulating pads 76. The outer downwardly extending end of the rack support 74 is formed with a cross member 78 formed with a pair of notches or grooves 80 for removably receiving the hook-shaped portions 82 of the work racks or workpieces adapted to be suspended therefrom.

The relationship of a work rack 84 supported by the work rack support 74 is illustrated in FIGURE 3 with the carriage in the lowered position whereby the work rack is immersed in a suitable receptacle containing a treating solution or an electroplating solution, as may be desired. In the case of an electroplating operation, suitable anodes 86 supported on rods 88 are immersed in the electroplating solution to each side of the work rack 84. In order to effect electrification of the workpieces supported on the work rack 84, the inner end portion of the L-shaped work rack support 74 is adapted to be disposed in electrical contact with a suitable direct current source. As exemplarily shown in FIGURE 3, the inner end portion of the rack support 74 may terminate in a suitable shoe 90 which is adapted to rest on and be positioned in electrical contact with a bus bar 92 as shown in FIGURE 3 when the carriage is located at a station at which an electroplating operation is to be performed with the work supporting arm in the fully lowered position.

Each carriage is also provided with a selector assembly which is effective upon a presetting thereof to establish the treating cycle to which the workpieces supported on the work supporting arm are subjected. As best seen in FIGURES 3–5, the selector mechanism comprises a laterally shiftable tube 94 which is slidably supported at an intermediate portion thereof in a bushing 96 affixed to the upper end of an upright brace 98 having its lower end securely fastened to the upper surface of the work supporting arm. The inner end of the laterally shiftable tube 94 is slidably supported in a second bushing 100 supported between the upright sides of the rectangular frame 60 forming the carriage. The inner end of the tube or the left end thereof as viewed in FIGURE 3, is securely fastened to a vertically disposed plate 102 to which a lower roller 104 and an upper roller 106 are rotatably secured by means of pins 108. The roller assembly comprising the plate 102 and upper and lower rollers 106, 104, is laterally shiftable inwardly to any desired position in accordance with the preselection desired and is retained in that position by means of a locking pin 110 extending through an aperture 112 formed in the bushing 96 which is adapted to be disposed in alignment with either of a series of apertures disposed in longitudinally spaced intervals along the laterally shiftable tube 94, as best seen in FIGURE 5. In accordance with this arrangement, appropriate lateral disposition of the roller assembly can be readily achieved at the load station of the machine in accordance with the nature of the workpieces loaded on the work supporting arm by simply withdrawing the locking pin 110 and laterally shifting the tube 94 to the appropriate position and thereafter reinserting the locking pin 110. In order to facilitate lateral movement of the shiftable tube between the selector positions, the outer end of the laterally shiftable tube 94 is formed with a knob 116 to facilitate engagement thereof by the operator. The prepositioning of the roller assembly, in accordance with the lateral positioning of the shiftable tube 94 determines the treating sequence to which the work racks are subjected in a manner subsequently to be described.

The lifting and lowering movement of the carriages, including the work supporting arm thereon, is achieved by the engagement of the lower roller 104 by suitable lift pads or supporting means on the elevator chassis 30. The elevator chassis 30, as shown in FIGURES 2 and 3, is guidably mounted by means of roller brackets 118 including rollers 120, which are disposed in rolling bearing contact against the side surfaces of the upright columns 24. Movement of the elevator chassis to and from a raised position and a lowered position, can be achieved by either of several lift mechanisms well known in the art such as, for example, by means of a fluid actuated double acting cylinder 122 mounted centrally of the machine frame as illustrated in FIGURE 2, to the rod end of which a pair of lift cables or chains 124 are secured which extend upwardly therefrom and are trained over pulleys or sprockets 126 (FIGURE 3) rotatably mounted between the upstanding flanges of the horizontal beam 28. The opposite ends of the lift cable 124 thereafter extend downwardly and are affixed to the frame of the elevator chassis. In accordance with this arrangement, reciprocation of the rod end of the lift cylinder 122 effects a corresponding lifting and lowering movement of the elevator chassis to and from a raised position and a lowered position. The elevator chassis when in the fully lowered position, is supported on a stop member 128. The control of the lift cylinder is achieved by means of an up position limit switch LS1 and a down position limit switch LS2, which are positioned as shown in FIGURE 3 and are adapted to be actuated by the roller brackets 118 when the elevator chassis attains the fully raised and the fully lowered positions, respectively. The up position and down position limit switches LS1, LS2, serve to signal the central control circuit which in turn controls the direction of flow of fluid to the ends of the double acting lift cylinder while simultaneously serving to signal the control system of the completion of the movement of the elevator chassis in order that the next operating cycle can commence.

Referring now to FIGURES 6 and 7, an arrangement of the lift pads on the elevator chassis is illustrated, which is effective to raise and lower the work supporting arms of each of the carriages in a preselected sequence, depending on the lateral positioning of the roller assembly comprising the lower roller 104 and the upper roller 106. In the exemplary arrangement illustrated in FIGURE 6, four feasible positions of the roller assembly are illustrated as shown at station S1. Each of the lift pads on the elevator chassis are, accordingly, of a preselected radial depth and of a preselected length in order to selectively engage or be disposed in clearance relationship relative to the lower engaging roller 104 on the work supporting arm. Commencing at station S1 corresponding to the load station of the conveying machine, as best seen in FIGURE 6, a first arcuate lift pad 130 is shown which is supported by a series of laterally extending angle braces 132 having the inner ends thereof securely affixed to the frame work of the elevator chassis. The input end portion of the arcuate lift pad 130 is disposed just to the left of station S1 as viewed in FIGURE 6. When the elevator chassis is in the fully lowered position, each of the work carrier arms are subjected to a short advancement by an advancing mechanism subsequently to be described, whereupon the work carriers and the work supporting arms including the roller assemblies thereon, are advanced from the position as shown at station S1 to a position as shown in phantom at X1 above the threshold portion of the arcuate lift pad 130. In this position, when the elevator chassis is raised, the work supporting arm of each work carrier at station S1 regardless of its lateral disposition of its roller assembly, is moved from the fully lowered position to the raised position. The arcuate lift pad 130 extends around the left hand arcuate end portion of the machine and terminates at station S3.

In order to facilitate an understanding of the disposition of the several lift pads on the elevator chassis, each of the four positions of the roller assembly on the work supporting arm and the corresponding oval track through which they move during the course of their travel around the conveying machine, are designated as P1, P2, P3, and P4, respectively. The P4 position comprises a storage position whereupon the work supporting arm after raising at station S1, is retained in the elevated position throughout its travel until being lowered at station S9. On the other hand, positions P1, P2 and P3 each provide for variations in the lifting and lowering movements of the work supporting arm in combination with the configuration of the lift pads on the elevator chassis and the supporting rails or selector tracks affixed to the upper portion of the frame.

Figure 9:
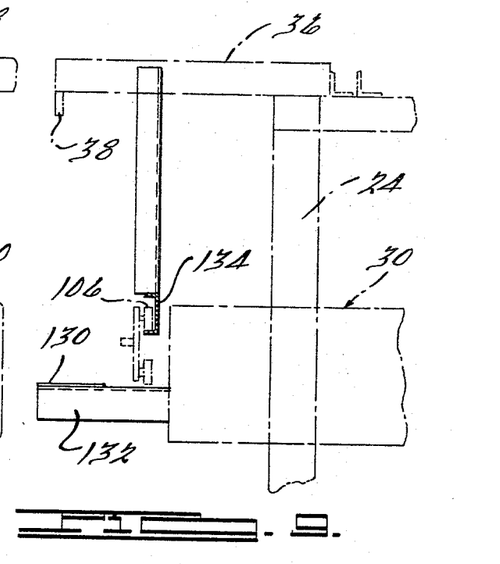
FIG. 9 is a fragmentary transverse vertical sectional view of the upper machine frame including the lift pads on the elevator chassis and the selector rails as shown in FIGURE 6 and taken along the line 9—9 thereof.

It will be noted that the arcuate lift pad 130 after its threshhold portion adjacent to station S1 is of a reduced width encompassing the pads P1, P2 and P3 of the roller assemblies on the work supporting arms whereby the lower engaging roller 104 is adapted to be engaged by the lift pad during the ascending and descending movement of the elevator chassis. On the other hand, when the roller assembly is disposed in position P4, the upper roller 106 upon being moved to an elevated position, is disposed in alignment with the inlet end of storage selector track section 134, as best seen in FIGURES 6, 7 and 9 whereupon the work supporting arm is retained in the elevated position even though the elevator chassis is subsequently lowered. As will be noted in FIGURES 6 and 8–12 the selector track section 134 extends from the threshold end of the arcuate lift pad 130 adjacent to station S1 around the machine to station S9 at which a T-shaped lift pad 136 is positioned for receiving the lower roller 104 of the roller assembly as the upper roller 106 is advanced out of the outlet end of the track section.

Figure 10:
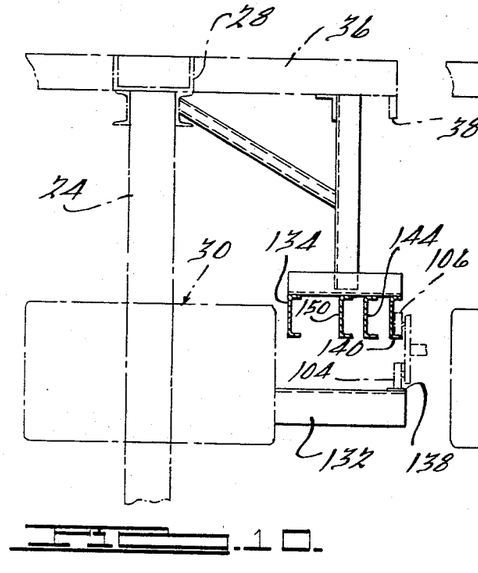
FIG. 10 is a fragmentary transverse vertical sectional view through the upper machine frame illustrating the disposition of the lift pads on the elevator chassis and the selector rails on the frame as shown in FIGURE 6 and taken along the line 10—10 thereof.

Referring back to FIGURE 6, a lift pad 138 supported by a brace 132, is positioned adjacent to station S4 and is of a radial width so as to support the roller assembly when positioned in position P1. The lift pad 138, when in the fully raised position, elevates the roller assembly as shown in FIGURE 10, such that the upper roller 106 is disposed in alignment with the input end of a selector track section 140 which extends around the machine and terminates at a point corresponding to the position of lift pad 136 at station S9. Accordingly, a work supporting arm having its roller in position P1, remains in the elevated position after being raised at station S4 until it is again lowered at station S9.

Figure 11:
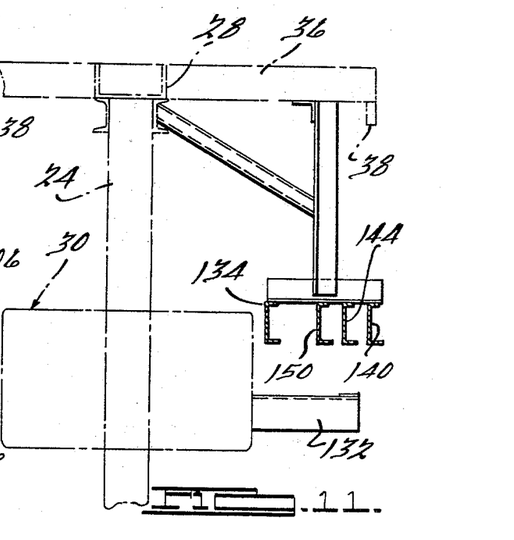
FIG. 11 is a fragmentary transverse vertical sectional view of the upper machine frame illustrating the disposition of the lift pads and the selector rails, as shown in FIGURE 6 and taken along the line 11—11 thereof.

A lift pad 142 is located at station S5 and is supported by an angle brace 132 in a position so as to encompass and provide support for a roller assembly disposed in position P2. The lift pad 142 is disposed at the outlet end of a selector track section 144 extending between stations S3 and S5 which is adapted to retain a work supporting arm in the raised position to clear these stations as it is advanced off the output end of the arcuate lift pad 130 at station S3. This relationship is also illustrated in FIGURES 10 and 11 of the drawings.

Still another lift pad 146 is positioned to the right of station S6 as viewed in FIGURE 6, and is of a radial width and is disposed in alignment with a roller assembly disposed in position P2. The lift pad 146 is adapted to engage and elevate a work supporting arm with its roller assembly in position P2 when advanced while the chassis is in the lowered position from station S6 to a position above the lift pad 146 and to elevate the work supporting arm such that upon subsequent advancement thereof, its upper roller 106 becomes engaged by and supported by selector track section 140a extending around the right hand end of the machine and terminating at station S9.

A lift pad 148 is mounted via an angle brace 132 at station S7 and is of a radial width to support a roller assembly when positioned in position P3. The lift pad 148 is adapted to receive the roller assembly of a work supporting arm which is retained in a raised position by the selector track section 150 extending from station S3 to station S7. Finally, the lift pad 136 is formed with an extension 136a extending between station S8 and station S9 and is of a radial width so as to support a roller assembly disposed in position P3.

It will be apparent from the foregoing arrangement that the several lift pads disposed around the perimeter of the elevator chassis and their lateral width and disposition in combination with the selector tracks affixed to the upper portion of the frame, are operative upon a presetting of the roller assembly of each of the work supporting arms at the load station to provide for a selected sequencing of the workpieces supported therefrom. It will be noted that some of the lift pads such as, for example, lift pads 138 and the input end of the arcuate lift pad 130, are longitudinally offset from the center of the treating station at which the work supporting arms are disposed during a treating operation. This offset is necessary in order to achieve the operating cycle of the machine since the arms are transferred intermittently employing a long advancing stroke when the elevator chassis is in the raised position and a short advancing stroke when the elevator chassis is in the lowered position. For example, with the roller assemblies aligned with station S1, as shown in FIGURE 6 and with the elevator chassis in the lowered position, an advancement of the roller assembly is achieved through a short stroke whereupon they are placed in alignment with the input or threshold end of the arcuate lift pad 130 corresponding to a centerline position indicated by the line X1. The elevator chassis thereafter moves from the lowered position to the raised position whereupon each of the lift arm assemblies are elevated. Thereafter, the transfer mechanism is again actuated effecting an advancement of the lift arm from the position X1 to a position in alignment with station S2 at the left hand end of the machine as viewed in FIGURE 6. When the work carrier arrives at station S2, the elevator chassis is again lowered to the fully lowered position whereupon the work racks suspended from the work supporting arm are immersed in the treating receptacle T1 (see FIGURE 1) and the chassis remains in a down position for a preselected time interval as established by a suitable down dwell timer incorporated in the central control circuit. At the expiration of the down dwell period, the transfer mechanism is again actuated effecting a short transfer of the work supporting arms such as from the position illustrated in alignment with station S2 to a position indicated at X2 in FIGURE 6. At the completion of the short transfer stroke, the lift cylinder of the elevator chassis is energized whereupon the elevator chassis moves to the raised position and the work supporting arm of the carrier is again raised to the fully elevated position. When the elevator chassis attains the fully raised position, as indicated by the tripping of up position limit switch LS1, the transfer mechanism is again actuated effecting a movement of the work supporting arm of the carriage from the position X2 to the position in alignment with station S3. At the completion of the advancing movement, the elevator chassis is again lowered and a work supporting arm having its roller assembly in position P1 is lowered at station S3. The down dwell timer again commences to time a predetermined down dwell period at the completion of which the transfer mechanism is again actuated effecting an advance of the work carrier from the position at station S3 to a position to the right thereof indicated by X3 in which case the lower engaging roller 104 of the roller assembly thereon, is advanced off the output end of the arcuate lift pad 130 such that the engaging roller is out of supporting alignment with the lift pad. Accordingly, upon the next elevating movement of the elevator chassis the work supporting arm with its lower assembly in its position P1 and disposed in alignment with position X3 to the right of station S3 as viewed in FIGURE 6, remains in the lowered position in the first station of receptacle T2 (FIGURE 1).

When the elevator chassis again attains a raised position, the large transfer stroke occurs at which the work carrier at position X3 adjacent to station S3 is advanced while in the lowered position to a position in alignment with station S4. The elevator chassis again descends and upon attaining the fully lowered position, the down dwell timer is actuated at the expiration of which the short transfer stroke occurs whereupon the carrier at station S4 with its roller assembly in position P1 is advanced from the position in alignment with station S4 to the position indicated at X4 whereupon its lower roller 104 is again disposed above the lift pad 138.

The elevator chassis subsequently is elevated and upon attaining the fully raised position the long transfer stroke occurs advancing the work supporting arm toward the right, as viewed in FIGURE 6, whereupon its roller 106, as may be best seen in FIGURE 10, becomes engaged by the selector track 140. Subsequent movements of the transfer mechanism through its long stroke and short stroke progressively effect an advancement of that work carrier to the positions S5, X5, S6, X6, S7, X7, S8, X8 and S9 at which the upper roller 104 emerges from the output end of selected track section 140 and whereupon its lower roller 104 is positioned in supporting relationship on the outer end of lift pad 136. Accordingly, subsequent downward movement of the elevator chassis effects a lowering of that work supporting arm at station S9 and subsequent advancement while the chassis is in the lowered position to position X9 enables the elevator chassis to again be raised whereby the roller assembly is disposed in vertical clearance relationship relative to the output end of lift pad 136. The work supporting arm with its roller in position P1 thereafter is advanced to station S10 at which the work racks thereon are unloaded by a short transfer to position X10 followed thereafter by the transfer to load station S1 at which a new work rack is loaded on the work supporting arm.

The operation and sequential movement of a work supporting arm with its roller assembly disposed in position P2, will now be described commencing with the work supporting arm disposed at the load station S1. As shown in FIGURE 6, and with the elevator chassis in the lowered position, the work carrier is advanced through a short stroke from station S1 to position X1 adjacent thereto after which the elevator chassis is raised effecting a lifting movement of that work supporting arm. The work supporting arm thereafter is advanced while in the raised position while being supported on the arcuate lift pad 130 in alignment with station S2. Thereafter, the elevator chassis is lowered whereby the work rack on that arm is lowered into the treating receptacle T1 (FIGURE 1). While in the lowered position the work supporting arm is advanced from the position at station S2 to position X2 as shown in FIGURE 6, after which the elevator chassis is again raised effecting a lifting of the work supporting arm to the elevated position after which it is advanced through a long transfer stroke to station S3 and during which movement its upper roller is moved into engagement with the input end of selector track 144. The chassis thereafter lowers but the work supporting arm is maintained in the elevated position above station S3.

Thereafter, when the chassis attains the lowered position and with the work supporting arm in the raised position, a short transfer occurs from the position at station S3 to position X3 after which the elevator chassis again ascends followed by a long transfer stroke whereby the work supporting arm is advanced to station S4. The arm remains engaged by the selector track section 144, after which the elevator chassis is lowered followed by a short transfer stroke to place it at position X4. The elevator chassis is again raised followed by a long transfer stroke whereby the supporting arm with its roller assembly in position P2 is advanced off the end of the selector track 144 and is positioned with its lower roller in supporting relationship on lift pad 142 at station S5. Accordingly, during the next descending movement of the elevator chassis, the work supporting arm resting on lift pad 142 is moved to the lowered position whereby the work racks supported thereon are immersed in the first station of tank T3 (FIGURE 1). At the completion of the down dwell period, a short transfer stroke occurs whereby the work supporting arm and roller assembly is advanced from position S5 to position X5 so that the roller assembly is out of vertical alignment with the lift pad 142 and the elevator chassis thereafter ascends leaving the supporting arm in the lowered position. When the elevator chassis attains the fully raised position, a long transfer stroke occurs whereby the supporting arm is advanced from position X5 to a position in alignment with station S6 corresponding to the second station of dual station tank T3 (FIGURE 1). The elevator chassis thereafter descends and in that position lift pad 146 thereon is disposed out of vertical alignment with the roller assembly of the arm positioned at station S6. At the completion of the appropriate down dwell period after the chassis attains the lowered position, a short stroke of the transfer mechanism occurs whereby the lower roller of the roller assembly is advanced into supporting relation on the lift pad 146 after which the elevator chassis again ascends lifting the work supporting arm to the raised position. When the elevator chassis attains the raised position, a long transfer stroke occurs whereby the upper roller of the roller assembly thereon is placed in engagement with selector track section 144a which retains that arm in the elevated position through the next succeeding transfer strokes until the arm is advanced into supporting relationship with lift pad 136 after being advanced out of the outlet end of selector track section 144a.

In operation of a work supporting arm with its roller assembly in position P3, the supporting arm is lifted upon being advanced from station S1 to position X1 by the input end of arcuate lift pad 130 and the supporting arm is thereafter lowered at station S2 and again raised when disposed in position X2. The arm thereafter is advanced to station S3 wherein its upper roller is engaged by selector track section 150 which retains the supporting arm in the elevated position until it is advanced from station S3 through stations S4–S6 until it is disposed in supporting relationship on lift pad 148 disposed at station S7. The arm with its roller assembly disposed in position P3 accordingly, undergoes a skip operation of treating receptacles T2 and T3 (FIGURE 1).

When at station S7, a lowering movement of the elevator chassis effects an immersion of the work supporting arm carried by lift pad 148 into treating receptacle T4 (FIGURE 1) through which it is advanced while in the lowered position to station S8. After the completion of a suitable down dwell period at station S8 the short transfer stroke advances the arm to position X8 at which the lower roller of the roller assembly on the supporting arm is advanced to a position above the extended section 136a of the lift pad 136, and accordingly, the arm is raised to the elevated position while disposed in position X8. When the elevator chassis attains the fully raised position, the long transfer stroke occurs whereupon the arm is advanced from position X8 to station S9 at which point it is lowered while supported on lift pad 136. At the completion of the down dwell period, a short transfer advances the arm to position X9 wherein the output end of the lift pad 136 is disposed in vertical clearance relationship relative to the roller assembly thereon. The next succeeding advancing movement passes the rack through the unload station U at station S10 at which the workpieces are removed and a new set of workpieces are reloaded at load station S1.

As previously disclosed, the work supporting arm with its roller assembly in position P4, is engaged by the input end of the storage selector track section 134 upon being advanced to position X1 and is retained in the raised position throughout the processing cycle until it is again lowered as it emerges from the output end of the storage selector section at station S9. The storage position of the work supporting arms are useful during the initiation of an operating run whereupon the racks are successively taken out of storage as they approach the load station and appropriate workpieces are loaded thereon. It is also desirable in some instances wherein one of the work supporting arms necessitates servicing to place it in a storage position whereupon increased access thereof is facilitated.

It will be apparent from the arrangement of the various lift pads in combination with the disposition of the several selector track sections coupled with the lateral adjustability of the roller assemblies on each of the work supporting arms, that any desired combination of variations in the processing cycle can be achieved consistent with the treating process and the workpieces to be treated. For this purpose, it will be understood that the several selector track sections and the individual lift pads are removably mounted so that removal, modification or replacement thereof at certain locations along the conveying machine can be readily achieved to provide for modifications in the processing cycle of the machine. In addition, it will also be understood that the number of lateral positions of the selector roller assembly on each work supporting arm can be increased or decreased from the four basic positions P1–P4 illustrated to provide for greater or lesser selections in the variations in cycles as may be desired. It will be further noted that the specific arrangement of the lift pads and selector tracks in combination with the long transfer movement of the arms when in the raised position and the short transfer movement of the arms when the chassis is in the lowered position provides for a completely mechanical selection of the cycle to which the work supporting arms are to be subjected without the necessity of incorporating ancillary controls at the several treating stations. The short transfer stroke when the elevator chassis is in the lowered position, is operative to selectively advance the roller support assemblies either into vertical alignment above or out of vertical alignment with the several lift pads on the elevator chassis.

This arrangement also dispenses with the necessity of employing ancillary mechanisms controlled by the central control circuit for selectively moving the individual lift pads into and out of engagement with the roller assemblies on the supporting arms. It will be noted that when the elevator chassis is in the fully lowered position, the lowermost roller 104 on the supporting arm is spaced in slight clearance relationship above the surface of the respective lift pad. In this event, the carriage including the U-shaped frame 52 is seated against the lower portion of the upright guide members 42, the weight of which in turn is supported by the lower supporting rail 34 of the machine.

Figures 12, 13, 14:
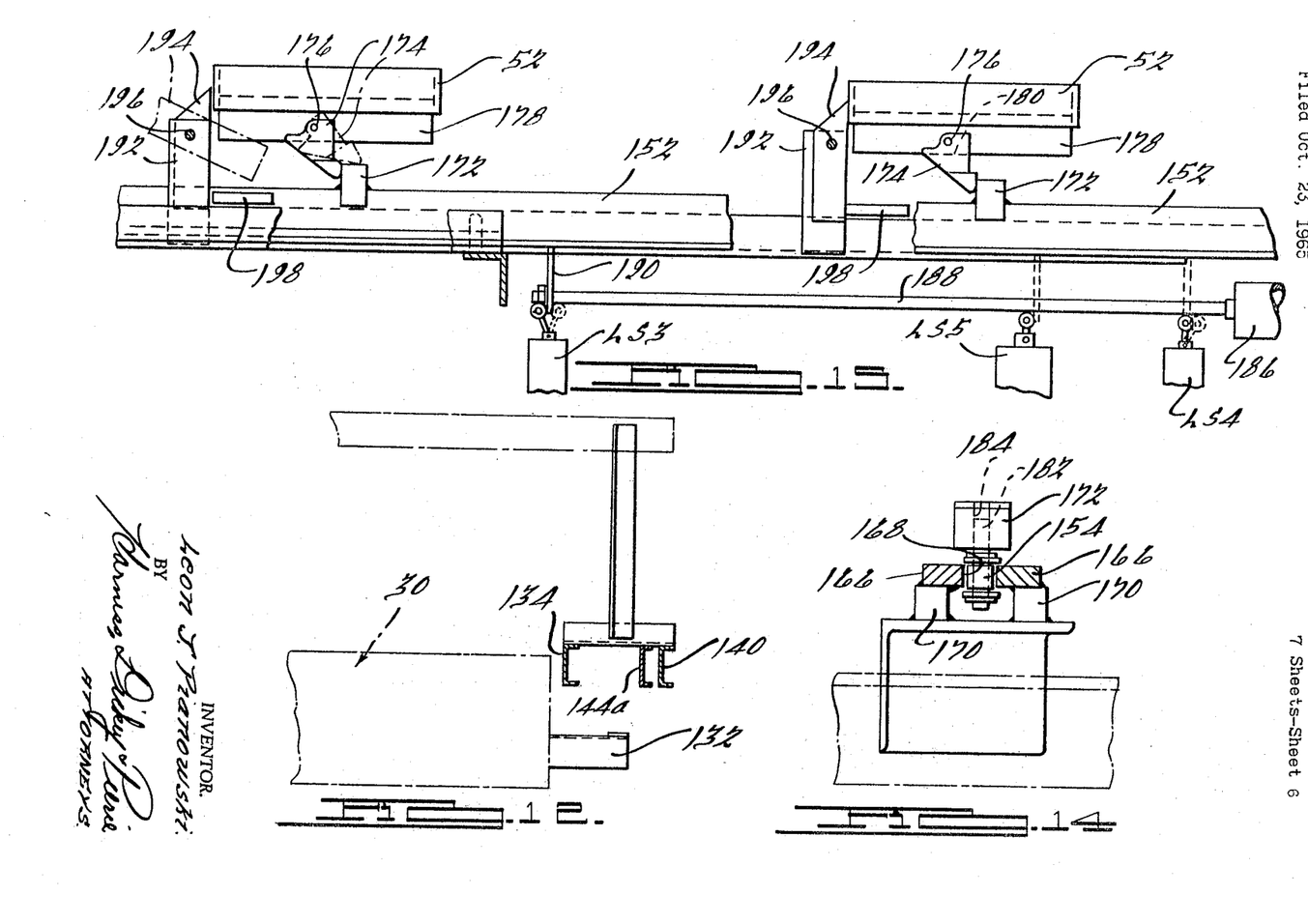
FIG. 12 is a fragmentary transverse vertical sectional view illustrating the disposition of the lift pads and the selector rails on the machine frame as shown in FIGURE 6 and taken along the line 12—12 thereof.
FIG. 13 is a fragmentary plan view of the transfer means for effecting intermittent longitudinal travel of each of the work carriers along the supporting rails.
FIG. 14 is a transverse sectional view of the advancing mechanism illustrated in FIGURE 13 and taken along the line 14—14 thereof.

The operation and construction of the transfer mechanism for effecting a long transfer movement of the work supporting arms when the elevator chassis is in the raised position and a short transfer movement of the work supporting arms when the chassis is in the lowered position will now be described with particular reference to FIGURES 13–15 inclusive. The transfer mechanism is mounted on the outer end portions of the cross beams 32 inwardly of the lower supporting rail 34, as shown in FIGURE 3, and extends around the entire machine for engaging and intermittently advancing the work carriers therealong. The left hand end of the transfer mechanism is illustrated in FIGURE 13 wherein the individual work carriers are fragmentarily shown as represented by the rearwardly extending U-shaped frames 52. Since each end of the transfer mechanism is substantially the same, a detailed discussion of the left hand end as illustrated in FIGURE 13, will suffice for a complete understanding of the advancing mechanism. As shown in FIGURES 3 and 13–15, the transfer mechanism comprises a pair of pusher bars 152 which are of an inverted T shape cross section and which extends along the straight side sections of the machine which are interconnected at their ends by a roller chain 154 extending around the arcuate end portions of the machine. The pusher bars 152 are slidably supported in suitable guide shoes 156 such as shown in FIGURE 3 to enable longitudinal reciprocatory movement thereof adjacent to the lower supporting rail 34. The pusher bar, as viewed in the upper portion of FIGURE 13, is provided with an adjustable connection comprising a T-shaped bracket 158 connected by means of adjusting bolts 160 to a pair of brackets 162 affixed to the adjacent pusher bar section in order that appropriate tensioning of the roller chains 154 along the arcuate end portions of the machine can be achieved. The ends of the roller chain 154 are connected by a suitable clevis type fitting 164 to the upstanding web of each of the pusher bars 152, as shown in FIGURE 13, in order that the reciprocating force applied to one pusher bar is transmitted to the roller chain and the opposite pusher bar providing reciprocation thereof in unison.

The roller chain 154 is maintained in appropriate guided relationship around the arcuate end portions of the machine by means of a pair of arcuate webs 166, as best seen in FIGURE 14, defining an arcuate slot 168 in which the sides of the rollers comprising the roller chain are disposed in rolling bearing guided contact. The arcuate webs 166 are rigidly affixed to suitable supporting pads 170 which in turn are mounted on the framework of the machine. A series of pusher dogs 172 are affixed to and project upwardly of the upstanding web of each of the pusher bars 152 and the upper surface of the roller chain 154 for engaging pivotally mounted pushers 174 which are mounted on and depend from the U-shaped frame 52 of each of the work carriers. The pivotally mounted pushers 174, as best seen in FIGURES 3 and 15 are pivotally mounted by means of a pivot pin 176 to a plate 178 rigidly connected to and extending between the leg portions of the U-shaped frame 52. The pivotally mounted pushers 174 are formed with a vertical rectangular slot 180 therein enabling the upper portions of the pusher to overlie the side surfaces of the plate 178. In accordance with this construction, the pivotally mounted pushers 174 are operable to pivot from an operative position as shown in solid lines in FIGURE 15 to an inoperative position as shown in phantom. When in the operative position and upon engagement by a pusher dog 172, as shown in FIGURE 15, advancement of the pusher bar 152 toward the left as viewed in FIGURE 15, causes the lower edge of the plate 178 to be engaged by the surface at the base of the vertical slot 180 of the pusher dog preventing any pivoting thereof. However, in response to the retraction of the pusher bar, contact of the pusher dog 172 with the rearward tapered surface of the pivotally mounted pusher 174, causes it to pivot to the inoperative position as shown in phantom in FIGURE 15, enabling the pusher dog to move to a position behind the pivotally mounted pusher preparatory to the next advancing movement. The pusher dogs 172 affixed to the roller chain 154 are connected, as best seen in FIGURE 14, to the elongated upper projecting end portions of pins 182 which are disposed in suitable bores 184 in the pusher dog.

Reciprocation of the transfer mechanism including the pusher bars and roller chains to and from an advance position and a retracted position, is achieved by a double acting fluid actuated cylinder, for example, indicated at 186 in FIGURE 15. The transfer cylinder 186 as fragmentarily shown in FIGURE 15, includes a piston rod 188, the end of which is affixed to a bracket 190 connected to the underside of the pusher bar for transferring the reciprocating movement of the piston rod to the transfer mechanism. The transfer mechanism is shown in the fully advanced position in FIGURE 15 wherein the piston rod 188 is fully projected and in which position forward limit switch LS3 has been actuated by the bracket 190. Actuation of the forward limit switch LS3 is effective to signal the central control circuit that the transfer mechanism has attained the fully advanced position which through suitable electrically actuated solenoid valves is operative to halt the further flow of pressurized fluid into the blank end of the transfer cylinder. A retraction of the transfer mechanism from the fully advanced position as shown in FIGURE 15 to the fully retracted position as shown in phantom, occurs during the descending movement of the elevator chassis and the completion of the retracting movement is signalled by the tripping of retract position limit switch LS4 which similarly signals the central control circuit that the fully retracted position has been attained halting further flow of pressurized fluid into the rod end of the transfer cylinder.

When the elevator chassis is in the lowered position, and as previously described, a short transfer of the pusher mechanism occurs. For this purpose an intermediate limit switch LS5 is provided which is energized only when the elevator chassis is in the lowered position and which is operative in response to a tripping thereof by the bracket 190 to halt further advancement of the transfer cylinder beyond the position as illustrated in phantom in FIGURE 15. Accordingly, when the elevator chassis is in the lowered position only a short transfer stroke occurs corresponding to the distance between retracted position limit switch LS4 and intermediate position limit switch LS5. It is convenient that limit switch LS5 be mounted on the elevator chassis such that it is disposed in tripping relationship relative to the bracket 190 of the transfer mechanism or other components of the pusher mechanism only when the elevator chassis is in the lowered position. Suitable mechanical stop means may also be incorporated on the elevator chassis which are adapted to be disposed in blocking relationship relative to the pusher mechanism to prevent an advancement thereof beyond the preselected short downward transfer stroke.

In accordance with a preferred embodiment of the present invention, suitable locking means are provided at least along the straight side portions of the conveying machine for engaging the work carriers preventing inadvertent movement thereof beyond their location at the completion of the advancing movement of the transfer mechanism. The latching mechanism as best illustrated in FIGURE 15 comprises an upstanding bracket 192 which is alternately disposed at opposite sides of the pusher bar at a location corresponding to the forwardmost projection of the U-shaped frame 52 at the completion of its advancing movement. A pivot member 194 is pivotally secured by means of a pivot pin 196 to the inner surface of each of the brackets 192 at a point offset from the center thereof such that normal gravity forces acting thereon maintain the pivot member 194 in a substantially upright direction. The pivot member 194 is also normally free to pivot in a clockwise or a counterclockwise direction.

The upper end of the pivot member 194, as best seen in FIGURES 3 and 15, projects upwardly and is adapted to be disposed in bearing contact against the forward surface of the U-shaped frame 52 of a work carrier at that station. The lower end portion of the pivot member 194 is adapted to be disposed in the path of travel of a tab 198 alternately affixed to opposite sides of the upstanding web of the pusher bar and is adapted to coact with the pivot member when the pusher mechanism is in the fully advanced position, as illustrated in FIGURE 15, preventing rotation thereof in a counterclockwise direction. It will also be noted that the tabs 198 are of a length so as to have their side edges disposed in clearance relationship relative to the upright brackets 192 on which the pivot members 194 are pivotally mounted.

The locking relationship provided by the locking mechanism will now be described with particular reference to FIGURES 3 and 15. In FIGURE 15 the transfer mechanism is shown in the fully projected position whereby the tab 198 on the pusher bar, as viewed on the left hand side of FIGURE 15 is disposed in contact with the lower trailing edge of the pivot member 194, while the upper trailing edge of the pivot member is disposed in obstructing alignment and in contact against the forward surface of the U-shaped frame 52. Accordingly, the pivot member 194 is prevented from rotating either clockwise or counterclockwise resulting in preventing the work carrier from moving toward the left from the position as shown in FIGURE 15. Movement of the work carriage toward the right similarly is prevented by virtue of the coacting relationship between the pusher dog 172 disposed in abutting contact against the pushing surface of the pivotally mounted pusher 174 which is prevented from pivoting by virtue of the engagement of the lower edge of the plate 178 with the lower surface of the vertical slot 180. Accordingly, the work carrier in this condition cannot be inadvertently moved from its fully advanced position. A similar condition exists with the work carriage and the latching mechanism as illustrated in the right hand side of FIGURE 15 but wherein the pivot member 194 and the tab 198 mounted on the opposite side from that arrangement as illustrated in the left hand side of FIGURE 15. Release of the locking member is achieved when the transfer mechanism is moved from the fully projected position, as shown in FIGURE 15, to the retracted position wherein the pusher dog 172, as viewed in the left hand side of FIGURE 15, is moved to a position corresponding to the location of the pusher dog as viewed in the right hand side of FIGURE 15. Similarly, the tab 198 is also retracted releasing the pivot member so that it may now rotate in a counterclockwise direction in response to the advancing movement of the carriage and the U-shaped frame in contact with the upper end thereof.

Accordingly, in response to the next advancing movement of the transfer mechanism, the pivot member 194 is pivoted from the vertical position as shown in solid lines in FIGURE 15, to a clearance position as shown in phantom, enabling the U-shaped frame to pass thereover and subsequently is again latched in a vertical position as the tab 198 contacts the lower edge thereof simultaneously with the contact of the leading edge of the U-shaped frame in a manner as shown in solid lines in FIGURE 15.

It will be apparent from the description of the conveying machine comprising the present invention, as hereinbefore set forth and as illustrated in the drawings, that a substantial simplification is provided in the means for obtaining variations in the processing cycle through which selective ones of the work carriers and the work supporting arms thereon are subjected.

While it will be apparent that the preferred embodiments of the invention as disclosed, are well calculated to fulfill the objects above stated, it will be appreciated that the invention is susceptible to modification, variation and change without departing from the proper scope or fair meaning of the subjoined claims.

What is claimed is:

1. A conveying machine for transferring workpieces through a series of treating stations comprising a framework, rail means on said framework extending along the treating stations, a work carrier including a vertically movable work supporting arm thereon movably mounted on said rail means, lift means on said framework movable to and from a raised position and a lowered position, presettable engaging means on said work supporting arm selectively positionable in a plurality of laterally spaced positions relative to the path of travel of said work carrier, coacting means on said lift means for engaging said engaging means when disposed in certain ones of said laterally spaced positions for moving said arm to and from said raised position and said lowered position in response to the ascending and descending movement of said lift means, track means on said framework extending longitudinally of said rail means between certain ones of said coacting means and disposed in laterally spaced intervals corresponding to the laterally spaced positions of said engaging means for engaging said engaging means when disposed in longitudinal alignment therewith and supporting said arms in said raised position along at least portions of the travel of said work carrier, and transfer means for intermittently advancing said work carrier along the treating stations.

2. A conveying machine for transferring workpieces through a series of treating stations comprising a framework, rail means on said framework extending along the treating stations, a work carrier movably mounted on said rail means, a work supporting arm movably mounted on said work carrier for movement to and from a raised position and a lowered position, lift means on said framework disposed adjacent to said rail means and movable to and from a raised position and a lowered position, presettable engaging means associated with said work supporting arm and selectively positionable in a plurality of laterally spaced positions relative to the path of travel of said work carrier, coacting means on said lift means for engaging said engaging means when disposed in certain ones of said laterally spaced positions for moving said arm to and from said raised position and said lowered position in response to the ascending and descending movement of said lift means, track means on said framework extending longitudinally of said rail means between certain ones of said coacting means and disposed in laterally spaced intervals for engaging said engaging means when disposed in longitudinal alignment therewith and for supporting said arms in said raised position along at least portions of the travel of said work carrier, and transfer means for intermittently advancing said work carrier along the treating stations when said lift means is in said raised and in said lowered position.

3. The conveying machine as defined in claim 2 further characterized as including a plurality of work carriers disposed at longitudinally spaced increments along said rail means and wherein each of said carriers includes independently presettable engaging means associated with said work supporting arm thereof for selectively varying the operating cycle to which the workpieces on each said work supporting arm is subjected.

4. The conveying machine as defined in claim 2 further characterized in that said rail means are disposed in a continuous loop configuration.

5. The conveying machine as defined in claim 2 further characterized in that said lift means comprise an elevator chassis which is substantially coextensive with said rail means.

6. The conveying machine as defined in claim 2 further characterized in that said presettable engaging means comprise a slidably mounted member incorporating roller means thereon adapted to be disposed in coacting relationship with said coacting means on said lift means and said track means on said framework.

7. The conveying machine as defined in claim 2 further characterized in that latching means are provided at least at some of the treating stations for retaining the work carrier in substantially fixed position relative to that station prior to the next advancing movement of said transfer means.

8. The conveying machine as defined in claim 2 further characterized in that said lift means comprises an elevator chassis substantially coextensive with said rail means and said coacting means thereon comprises a plurality of stationarily mounted lift pads having a lifting surface of a preselected longitudinal length and lateral width.

9. The conveying machine as defined in claim 2 further characterized in that said transfer means comprise a reciprocatory pusher mechanism extending longitudinally of said rail means and movable to and from a retracted position and an advanced position for intermittently advancing the work carrier from one station to the next adjacent station.

10. The conveying machine as defined in claim 2 further characterized in that said transfer means are operable when said lift means is in said raised position to advance said work carrier through an increment corresponding substantially to the distance between adjoining treating stations and when said lift means is in said lowered position to transfer said work carrier through a substantially shorter increment whereby said engaging means are advanced off the end of or on the end of said coacting means on said lift means.

11. The conveying machine as defined in claim 2 further characterized in that said coacting means on said lift means when in said lowered position, are disposed in clearance relationship below said engaging means on said work supporting arm.

References Cited

UNITED STATES PATENTS 2,945,579  7/1960  Barton ___________ 214—89 X
3,152,705  10/1964  Lammert ___________ 214—89

GERALD M. FORLENZA, *Primary Examiner.*

A. J. MAKAY, *Examiner.*